United States Patent
Duan

(10) Patent No.: US 7,801,102 B2
(45) Date of Patent: Sep. 21, 2010

(54) MOBILE STATION APPARATUS, BASE STATION APPARATUS, AND TRANSMISSION RATE CONTROL METHOD

(75) Inventor: Jinsong Duan, Kanagawa (JP)

(73) Assignee: Panasonic Corporation, Osaka (JP)

( * ) Notice: Subject to any disclaimer, the term of this patent is extended or adjusted under 35 U.S.C. 154(b) by 659 days.

(21) Appl. No.: 11/719,048

(22) PCT Filed: Oct. 27, 2005

(86) PCT No.: PCT/JP2005/019808

§ 371 (c)(1),
(2), (4) Date: May 10, 2007

(87) PCT Pub. No.: WO2006/051695

PCT Pub. Date: May 18, 2006

(65) Prior Publication Data

US 2007/0263585 A1    Nov. 15, 2007

(30) Foreign Application Priority Data

Nov. 12, 2004    (JP)    ............................. 2004-329590

(51) Int. Cl.
*H04B 7/216*    (2006.01)
*H04W 4/00*    (2009.01)

(52) U.S. Cl. .................. 370/342; 370/329; 370/331

(58) Field of Classification Search .................. None
See application file for complete search history.

(56) References Cited

U.S. PATENT DOCUMENTS

2005/0141454 A1* 6/2005 Jain et al. .................. 370/331
2005/0201280 A1* 9/2005 Lundby et al. ............. 370/229
2006/0018277 A1* 1/2006 Petrovic et al. ............ 370/329

OTHER PUBLICATIONS

PCT International Search Report dated Jan. 24, 2006.
3GPP TR25.896 V2.0.0 (Mar. 2004), 3rd Generation Partnership Project; Technical Specification Group Radio Access Network; Feasibility Study for Enhanced Uplink for UTRA FDD; (Release 6), pp. 1-180, Mar. 2004.
3GPP TSG-RAN WG1 Meeting #38bis, "EUL scheduling: signaling support," Samsung, Tdoc R1-041084, Sep. 2004, 7 pages.
3GPP TSG-RAN AH Release 6, "Scheduling for EUL," Qualcomm Europe, R1-040728, Jun. 2004, pp. 1-5.

* cited by examiner

*Primary Examiner*—Erika A Gary
(74) *Attorney, Agent, or Firm*—Dickinson Wright PLLC

(57) ABSTRACT

A mobile device, a base station device, and a transmission rate control method for preventing the reception power at all the base station devices of an active set from exceeding an RoT threshold and preventing an excessive load. A transmission rate command acquiring section (304) of the mobile station device (300) acquires transmission rate commands transmitted from the base station devices (100a to 100c) from a received signal. A transmission rate determining section (305) determines the transmission rate of the uplink channel according to the transmission rate command. A DOWN monitoring section (306) monitors the transmission rate command from the base station devices (100b, 100c) of a non-primary cell and monitors the amount of "DOWN". The DOWN monitoring section (306) judges that the load is heavy in a base station device where the amount of "DOWN" is large. If there is a base station device where the load is heavy, an another-cell load information creating section (307) creates another-cell load information for inhibiting creation of AG by the base station device (100a) of the primary cell.

8 Claims, 10 Drawing Sheets

| TIME | BASE STATION APPARATUS #1 (PRIMARY CELL) | BASE STATION APPARATUS #2 | BASE STATION APPARATUS #3 | BASE STATION APPARATUS #4 | MOBILE STATION APPARATUS | TRANSMISSION RATE |
|---|---|---|---|---|---|---|
| 1 | AG128K | H | H | H | H | 128K |
| 2 | AG128K | D | H | H | D | 64K |
| 3 | AG128K | H | D | H | D | 32K |
| 4 | AG128K | H | H | D | D | 0 |
| 5 | AG128K | D | H | H | D | 0 |
| 6 | AG 32K | H | H | H | H | 32K |
| 7 | AG512K | H | D | H | H | 512K |
| 8 | AG512K | D | D | D | D | 256K |
| 9 | AG512K | D | D | D | D | 128K |
| 10 | AG512K | D | D | D | D | 64K |
| 11 | AG512K | D | D | D | D | 32K |

PRIOR ART
FIG.1

| TIME | BASE STATION APPARATUS #1 (PRIMARY CELL) | BASE STATION APPARATUS #2 | BASE STATION APPARATUS #3 | BASE STATION APPARATUS #4 | MOBILE STATION APPARATUS | TRANSMISSION RATE |
|---|---|---|---|---|---|---|
| 1 | AG 32K | H | H | H | H | 32K |
| 2 | AG512K | H | H | H | H | 512K |
| 3 | AG512K | H | H | H | H | 512K |
| 4 | AG512K | D | D | D | D | 384K |
| 5 | AG512K | D | D | D | D | 256K |
| 6 | AG512K | D | D | D | D | 128K |
| 7 | AG512K | D | D | D | D | 96K |
| 8 | AG512K | D | D | D | D | 64K |
| 9 | AG512K | H | H | H | H | 32K |

PRIOR ART
FIG.2

| TFC Index | DATA RATE (kbps) |
|---|---|
| 0 | TRANSMISSION STOPPING |
| TFC1 | 16 |
| TFC2 | 32 |
| TFC3 | 64 |
| TFC4 | 96 |
| TFC5 | 128 |
| TFC6 | 256 |
| TFC7 | 384 |
| TFC8 | 512 |
| TFC9 | 640 |
| TFC10 | 768 |
| TFC11 | 896 |
| TFC12 | 1024 |

FIG.6

MOBILE STATION APPARATUS, BASE STATION APPARATUS, AND TRANSMISSION RATE CONTROL METHOD

TECHNICAL FIELD

The present invention relates to a mobile station apparatus, base station apparatus,and a transmission rate control method, and particularly relates to a mobile station apparatus, base station apparatus, and transmission control method in a mobile communication system where a mobile station is instructed an uplink transmission rate from a plurality of base stations during a soft handover. This specification is based on Japanese patent application No. 2004-329590, filed on Nov. 12, 2004, the entire content of which is expressly incorporated by reference herein.

BACKGROUND ART

In recent years, HSUPA (High Speed Uplink Packet Access) is being researched as a transmission standard for achieving high-speed for communication packets of an uplink in W-CDMA (Wideband-Code Division Multiple Access). In HSUPA, an E-DCH (Enhanced-Dedicated Channel) is provided as a dedicated channel for transmitting uplink packets.

The power of this E-DCH occupies portions of received signal power for the base station apparatus other than portions for thermal noise power, other cell interference power, and power of dedicated channels used in communication such as for speech etc. In other words, it is possible to allocate E-DCH to power where three types of power of thermal noise power, other cell interference power, and dedicated channel power are subtracted from the RoT threshold value (RoT (Rise over Thermal threshold)) indicating the maximum receiving power that can be received by a base station apparatus.

Here, it is necessary to allocate E-DCH power to mobile station apparatuses efficiently and to carry out uplink packet communication because a plurality of mobile station apparatus belong to the cells covered by the base station apparatus. Non patent document 1 discloses carrying out scheduling by base station apparatus in order to distribute this E-DCH power to the mobile station apparatus in an efficient manner.

On the other hand, the mobile station apparatus carries out a soft handover during positions near the boundary of a plurality of cells and communicates with a plurality of base station apparatuses. At this time, regarding the mobile station apparatus during soft handover, scheduling is carried out by a plurality of base station apparatuses, and the uplink transmission rate is controlled. Namely, transmission rate commands are transmitted from a plurality of base station apparatuses to one mobile station apparatus to control the uplink transmission rate, and the mobile station apparatus is required to decide the actual uplink transmission rate from the plurality of transmission rate commands.

One such transmission rate control method is proposed in, for example, non patent document 2. In non patent document 2, one primary cell is selected from cells of a plurality of base station apparatuses with which a mobile station apparatus communicates at the same time during a soft handover (hereinafter referred to as "active set" base station apparatuses). A primary cell base station apparatus freely instructs a transmission rate of the mobile station apparatus including transmitting an absolute transmission rate command (AG: Absolute Grants) specifically specifying an uplink transmission rate. A base station apparatus for non-primary cells other than the primary cells transmits a relative transmission rate command (RG: Relative Grants) indicating either of "HOLD" indicating maintaining of the transmission rate or "DOWN" indicating reduction in the transmission rate. The primary cell base station apparatus also transmits RG as the transmission rate command but the primary cell base station apparatus not only transmits "HOLD" and "DOWN" as the RG, but also transmits "UP" indicating to increase the transmission rate. Namely, the primary cell base station apparatus freely instructs the transmission rate using both AG and RG, and, in contrast, the non-primary cell base station apparatus instructs other than to increase the transmission rate using just RG.

Although the mobile station apparatus basically conforms to AG or RG from the primary cell, by taking into consideration RG from the non-primary cell, the mobile station apparatus is able to achieve prompt optimization of the transmission rate and suppress increase in interference power at all cells of the active set base station apparatuses.

Specifically, referring to FIG. 1, the case where cell of base station apparatus #1 of base station apparatuses #1 to #4 of the active set is a primary cell will be described. FIG. 1 is a view showing AG for the base station apparatus #1 (primary cell), RG for the base station apparatuses #2 to #4 (non-primary cell), the operations of the mobile station apparatus, and the transmission rate of the actual uplink.

For example, at time 1, base station apparatus #1 transmits an instruction (AG) indicating to carry out uplink communication at a transmission rate of 128 bps (kilobits per second) to the mobile station apparatus. Further, base station apparatuses #2 to #4 transmits "HOLD" (RG) indicating to maintain the current transmission rate to the mobile station apparatus taking into consideration propagation environment and communication conditions in the cells. In FIG. 1, holding of the transmission rate (HOLD) is shown by "H," and reducing of the transmission rate (DOWN) is shown by "D."

As the RG of base station apparatuses #2 to #4 are all "HOLD," the mobile station apparatus determines that there are no non-primary cells where the interference power is excessive, sets the transmission rate to 128 kbps in accordance with the base station apparatus #1 and transmits packets.

Next, at time 2, base station apparatus #1 again transmits AG of 128 kbps. On the other hand, base station apparatus #2 transmits an instruction "DOWN" indicating to reduce transmission rate, and base station apparatuses #3 and #4 transmit "HOLD."

As the RG of base station apparatus #2 is "DOWN," the mobile station apparatus determines that the interferences power of a cell of base station apparatus #2 is excessive, and reduces the transmission rate by just a reduction width set in advance. The mobile station apparatus then reduces the transmission rate by one stage without conforming to AG of base station apparatus #1, sets 96 kbps, and transmits packets.

By carrying out this kind of transmission rate control, it is possible to rapidly change the transmission rate using AG of a primary cell, and suppress increases in interference power at non-primary cells using RG of non-primary cells.

Non patent document 1: 3GPP TR25.896 V6.0.0 (2004-03)
Non patent document 2: "EUL scheduling: signaling support," 3GPP TSG-RAN WG1 Meeting #38bis, R1-041084 (2004-09)

DISCLOSURE OF INVENTION

Problems to be Solved by the Invention

However, with the transmission rate control method described above, when conforming to AG of a primary cell, the transmission rate substantially changes sometimes, and, on the other hand, when conforming to RG of a non-primary cell, the transmission rate increases or decreases by a predetermined width at a time, and the received signal power at the non-primary cell then temporarily exceeds the RoT threshold value, resulting in excessive loads.

This problem will be described in a detail with reference to the example of FIG. 2. FIG. 2 is a view showing transmission rate control at time 1 to 8 as in FIG. 1.

At time 1, AG of 32 kbps is transmitted from base station apparatus #1, and "HOLD" is transmitted from base station apparatuses #2 to #4. Because of this, the mobile station apparatus sets the transmission rate to 32 kbps in accordance with AG of base station apparatus #1 and transmits packets. Base station apparatuses #1 to #4 receive packets transmitted at 32 kbps.

Next, at time 2, for example, when the load at base station apparatus #1 falls, base station apparatus #1 transmits AG indicating the transmission rate to be increased to 512 kbps. Further, base station apparatuses #2 to #4 receive packets transmitted at 32 kbps under transmission rate control at time 1 where interference power is not excessive, and, like at time 1, "HOLD" is transmitted from base station apparatuses #2 to #4. Because of this, the mobile station apparatus sets the transmission rate to 512 kbps in accordance with AG of the base station apparatus#1 and transmits packets. Base station apparatuses #1 to #4 receive packets transmitted at 512 kbps.

When the transmission rate becomes 512 kbps, the receiving power at base station apparatuses #2 to #4 exceeds the RoT threshold value, and at time 3, "DOWN" is transmitted from base station apparatuses #2 to #4. Because of this, the mobile station apparatus reduces by one stage and sets the transmission rate to 384 kbps in accordance with RG of the base station apparatuses #2 to #4 and transmits packets. Base station apparatuses #1 to #4 receive packets transmitted at 384 kbps.

However, even if the transmission rate is reduced to 384 kbps, the receiving power at base station apparatuses #2 to #4 still exceeds the RoT threshold value, and even at time 4, "DOWN" is transmitted from base station apparatuses #2 to #4. The mobile station apparatus then again reduces the transmission rate by one stage, sets the transmission rate to 256 kbps, and transmits packets. However, even if the transmission rate is 256 kbps, the load at base station apparatuses #2 to #4 is still excessive, and even from time 5 onwards, "DOWN" is transmitted from base station apparatuses #2 to #4.

In this way, when the transmission rate increases substantially due to AG of primary cell base station apparatus #1, at non-primary cell base station apparatuses #2 to #4, the receiving power exceeds the RoT threshold value. Because of this, base station apparatus #2 to#4 transmit "DOWN," but RG from non-primary cell base station apparatuses #2 to #4 are different from AG from primary cell base station apparatus #1 and reduces the transmission rate only by a predetermined width in stages. The situations where the load is excessive thus continue sometimes at base station apparatuses #2 to #4.

It is therefore an object of the present invention to provide a mobile station apparatus, base station apparatus, and a transmission rate control method that are able to suppress receiving power at all active set base station apparatuses from exceeding the RoT threshold value and prevent loads from becoming excessive.

Means for Solving the Problem

A mobile station apparatus of the present invention is a mobile station apparatus simultaneously communicating with a plurality of base station apparatuses including one primary cell base station apparatus transmitting an absolute transmission rate command and at least one non-primary cell base station apparatus transmitting a relative transmission rate command, and adopting a configuration having: a determining section that determines whether or not a load at the non-primary cell base station apparatus is equal to or greater than a predetermined level; and a deciding section that decides an uplink transmission rate according to only the relative transmission rate command when the load at the non-primary cell base station apparatus is equal to or greater than the predetermined level.

A base station apparatus of the present invention is a base station apparatus communicating with a plurality of mobile station apparatuses including a mobile station apparatus during soft handover and adopting a configuration having: a receiving section that receives other cell load information indicating load states at another base station apparatus, other than the base station apparatus, with which the mobile station apparatus during the soft handover is communicating; and a scheduling section that generates an absolute transmission rate commands or relative transmission rate commands corresponding to uplink transmission rates allocated to the plurality of mobile station apparatuses, in this apparatus the scheduling section restricts generation of the absolute transmission rate commands when the load at the another base station apparatus other than the base station apparatus is determined to be equal to or greater than a predetermined level by the other cell load information.

A transmission rate control method of the present invention is a transmission rate control method for a mobile station apparatus simultaneously communicating with a plurality of base station apparatuses including one primary cell base station apparatus transmitting absolute transmission rate commands and at least one non-primary cell base station apparatus transmitting relative transmission rate commands, and has the steps of: determining whether or not a load at the non-primary cell base station apparatus is equal to or greater than a predetermined level; and deciding an uplink transmission rate according to only the relative transmission rate command when the load at the non-primary cell base station apparatus is equal to or greater than the predetermined level.

Accordingly, when load at the non-primary cell base station apparatus is large, uplink transmission rate is decided according to only relative transmission rate commands. The uplink transmission rate therefore does not increase abruptly due to absolute transmission rate commands, receiving power at all of the base station apparatus of the active set is suppressed from exceeding an RoT threshold value, and excessive loads can be prevented.

Advantageous Effect of the Invention

According to the present invention, it is possible to suppress receiving power at all base station apparatus of an active set from exceeding an RoT threshold value and it is possible to prevent excessive load.

BRIEF DESCRIPTION OF THE DRAWINGS

FIG. 1 is a view showing a specific example of uplink transmission rate control;

FIG. 2 is a view showing a further specific example of uplink transmission rate control;

FIG. 6 is a view showing an example of transmission rate of Embodiment 1;

BEST MODE FOR CARRYING OUT THE INVENTION

Embodiments of the present invention will be described in detail below with reference to the accompanying drawings.

Embodiment 1

Figure 3:
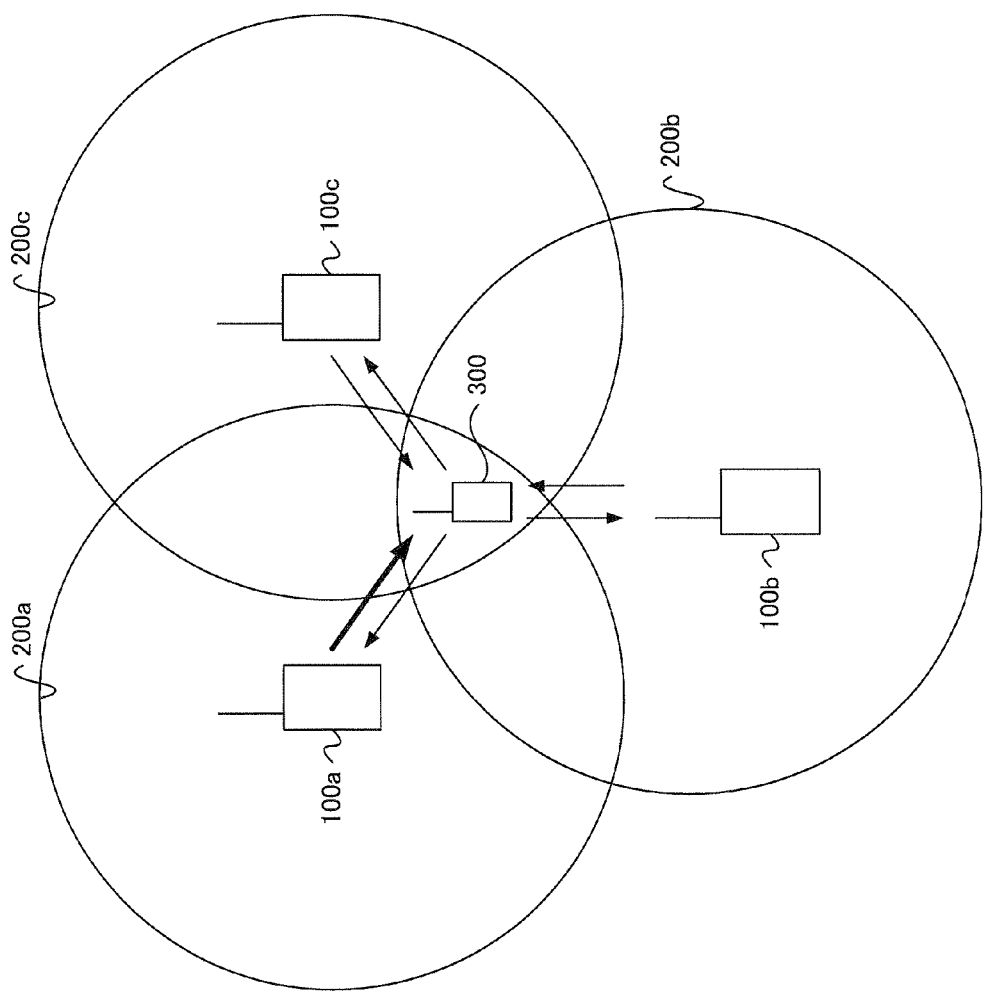
FIG. 3 is a view showing a configuration for a mobile communication system of Embodiment 1 of the present invention.

FIG. 3 is a view showing a configuration for a mobile communication system of Embodiment 1 of the present invention. As shown in the same drawing, base station apparatuses 100a to 100c are close to each other and cover cells 200a to 200c, respectively. Mobile station apparatus 300 is positioned near the boundary of cells 200a to 200c and carries out a soft handover taking base station apparatuses 100a to 100c as the communicating party. Namely, base station apparatuses 100a to 100c are base station apparatus of an active set of mobile station apparatus 300.

Further, cell 200a is a primary cell of mobile station apparatus 300, and cell 200b and 200c are non-primary cells of mobile station apparatus 300. An AG specifically specifying the uplink transmission rate or an RG of one of "UP," "HOLD," or "DOWN" is transmitted from base station apparatus 100a covering the cell 200a to mobile station apparatus 300 (thick arrow in the drawing). Further, RG of "HOLD" or "DOWN" is transmitted to mobile station apparatus 300 from base station apparatuses 100b and 100c covering cells 200b and 200c. Namely, there is no authority to increase the uplink transmission rate at non-primary cell base station apparatuses 100b and 100c. Mobile station apparatus 300 then receives these AG and RG, decides the final uplink transmission rate, and transmits the signal using the modulation method, coding rate and transmission power according to the decided transmission rate.

Figure 4:
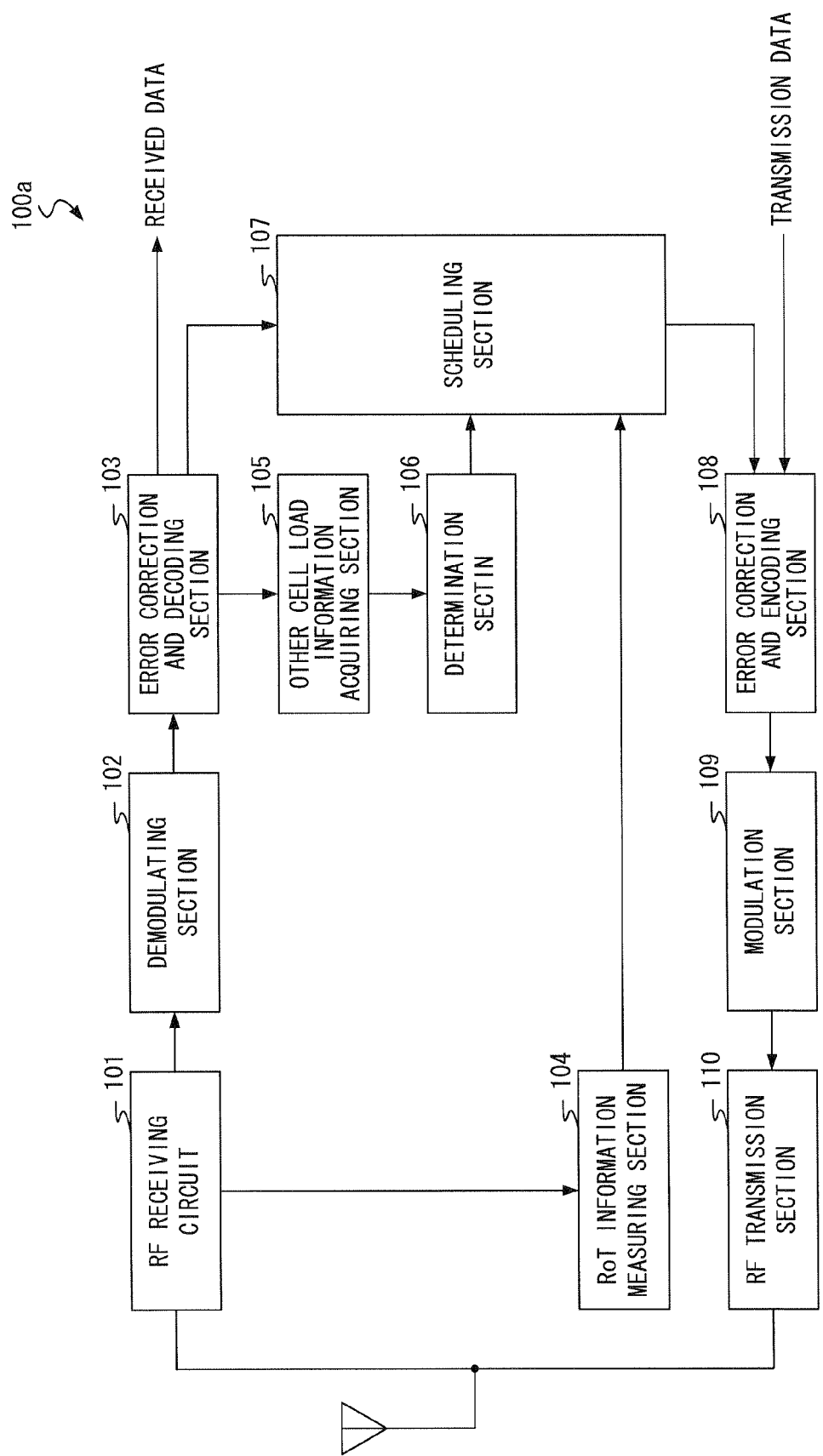
FIG. 4 is a block view showing a configuration of the main part of a base station apparatus of Embodiment 1.

FIG. 4 is a block view showing the configuration of the main part of base station apparatus 100a of this embodiment. Base station apparatus 100a shown in FIG. 4 is comprised of: RF (Radio Frequency: wireless frequency) receiving section 101; demodulating section 102; error correction decoding section 103; RoT (Rise over Thermal) information measuring section 104; other cell load information acquiring section 105; determining section 106; scheduling section 107; error correction encoding section 108; modulating section 109; and RF transmission section 110. Base station apparatuses 100b and 100c also have the same configurations.

RF receiving section 101 receives signals transmitted from mobile apparatuses within cell 200a including mobile station apparatus 300 via an antenna, and performs predetermined radio receiving processing (down converting, A/D conversion, etc.) on the received signal.

Demodulating section 102 demodulates the received signal after radio receiving processing, and outputs the obtained demodulated signal to error correction decoding section 103. Demodulating section 102 carries out demodulation in a manner corresponding to the modulation method applied at the mobile station apparatuses as the results of transmission rate control at the mobile station apparatuses.

Error correction decoding section 103 performs error correction and decoding on the demodulated signal, outputs the received data, outputs requested transmission rate information indicating the uplink transmission rate requested by the mobile station apparatuses to scheduling section 107, and outputs other cell load information indicating the load state at the cells of active set base station apparatuses (here, base station apparatuses 100b and 100c) other than the base station apparatus (hereinafter referred to as an "other cell") to other cell load information acquiring section 105. Error correction decoding section 103 carries out error correction and demodulation in a manner corresponding to the coding rate applied at the mobile station apparatuses as the results of transmission rate control at the mobile station apparatuses.

RoT information measuring section 104 measures breakdown of receiving power at RF receiving section 101, and outputs RoT information relating to this breakdown to scheduling section 107. Specifically, RoT information measuring section 104 measures thermal noise power, interference power from another cell, dedicated channel power from the mobile station apparatuses within cell 100a, and E-DCH power from the mobile station apparatuses within cell 100a at the receiving power at RF receiving section 101, and outputs RoT information indicating this breakdown to scheduling section 107.

Other cell load information acquiring section 105 acquires other cell load information transmitted from mobile station apparatus 300 from the received signal after error correction decoding and outputs the result to determining section 106. As described above, the other cell load information indicates the load states of the base station apparatuses other than the base station apparatus (here, base station apparatuses 100b and 100c) and is generated and transmitted by mobile station apparatus 300. Generation of the other cell load information will be described later.

Determining section 106 determines whether or not the base station apparatus is a primary cell base station apparatus, and, when the base station apparatus is a primary cell, refers to other cell load information and determines whether or not loads at base station apparatuses of the other cells (that is, non-primary cells) are large. When the load of any other cell is large, determining section 106 reports of prohibiting instructing the transmission rate using AG to mobile station apparatus 300 to scheduling section 107. Further, when the load of all of the other cells is small, determining section 106 reports a permission of instruction of the transmission rate using AG to mobile station apparatus 300 to scheduling section 107. When the load of any other cell is large, determining section 106 may also report that permission is provided if an increase is up to a transmission rate of a predetermined width to the scheduling section 107, rather than completely prohibiting instructing an transmission rate by AG.

Further, when the base station apparatus is a non-primary cell, determining section 106 discards the other cell load information, and does not carry out any operation for scheduling section 107.

Scheduling section 107 then carries out scheduling for the mobile station apparatus within cell 100a in accordance with the requested transmission rate information outputted by error correction decoding section 103, RoT information outputted by RoT information measuring section 104, and a report from determining section 106. Specifically, scheduling section 107 determines whether or not the requested transmission rate information transmitted from the mobile station apparatus can be satisfied from the RoT information, decides the transmission rate allocated to the mobile station apparatus, generates a transmission rate command corresponding to this transmission rate, and outputs the result to error correction encoding section 108.

At this time, if receiving a report of prohibiting AG from determining section 106, scheduling section 107 does not generate transmission rate commands specifying the absolute transmission rates even if the base station apparatus is a primary cell base station apparatus, and a transmission rate command instructing a relative transmission rate using "UP," "HOLD," "DOWN" is generated. Namely, when the other cell load is large, scheduling section 107 generates an RG transmission rate command rather than an AG transmission rate command. Further, if receiving a report of permitting an increase in the transmission rate of a predetermined amount from determining section 106, scheduling section 107 generates a transmission rate command for AG within the permitted range.

Further, scheduling section 107 may also generate a transmission rate command directly specifying, for example, an index (FGCI: TFCIndex) for a TFC (Transport Format Combination) corresponding to the data rate as shown in FIG. 6 as an AG transmission rate command. In this event, the RG transmission rate command means that TFC becomes one stage higher or lower.

Error correction encoding section 108 performs error correction encoding on the transmission rate commands and transmission data and outputs the obtained encoded data to modulating section 109.

Modulating section 109 modulates the encoded data and outputs the obtained modulated data to RF transmission section 110.

RF transmission section 110 performs predetermined wireless transmission processing (D/A conversion, up conversion, etc.) on the modulation data and transmits the result via an antenna.

Figure 5:
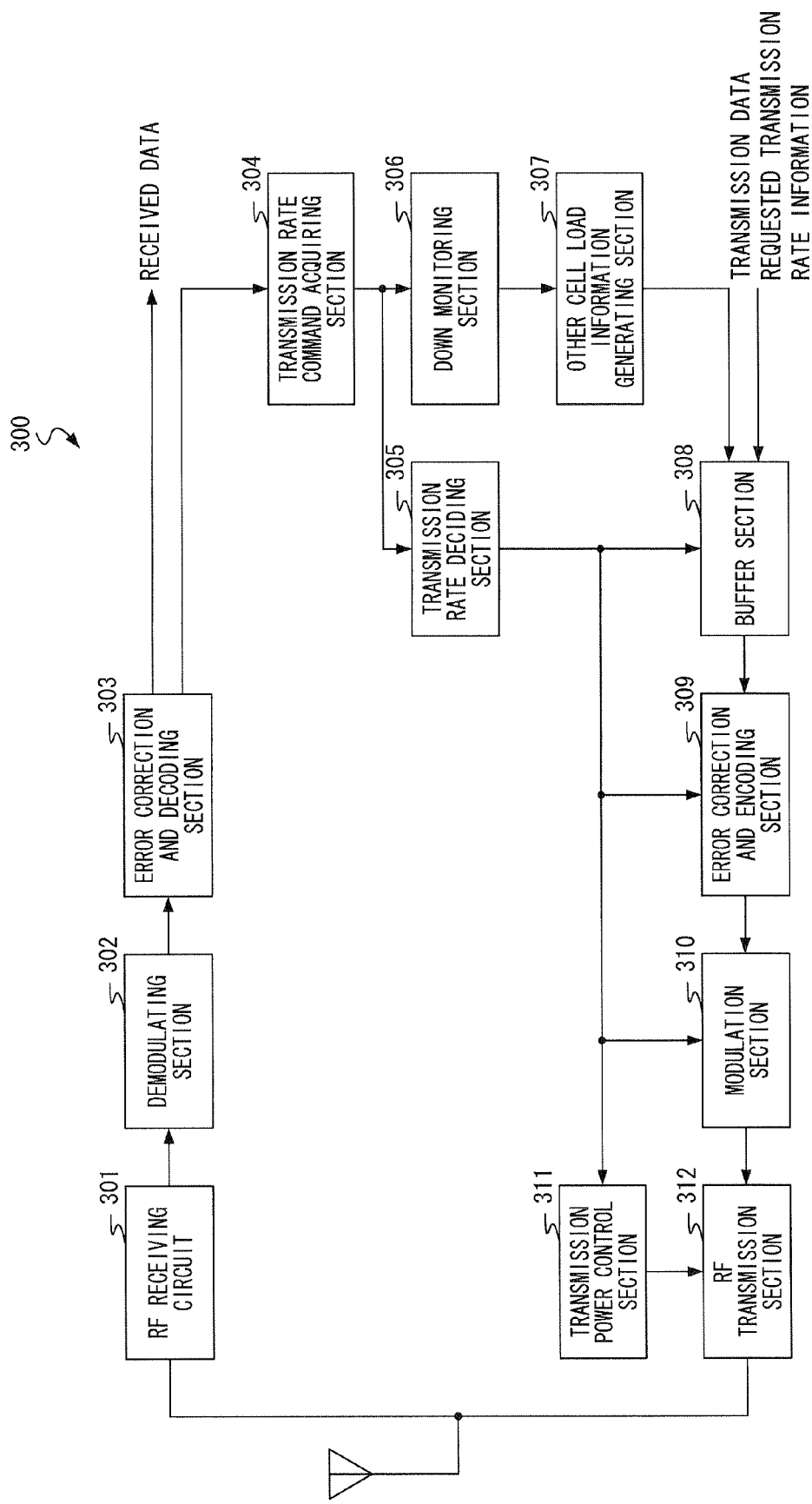
FIG. 5 is a block view showing a configuration of the main part of a mobile station apparatus of Embodiment 1.

FIG. 5 is a block view showing the configuration of the main part of mobile station apparatus 300 of this embodiment. Mobile station apparatus 300 shown in FIG. 5 is comprised of: RF receiving section 301; demodulating section 302; error correction and decoding section 303; transmission rate command acquiring section 304; transmission rate deciding section 305; DOWN monitoring section 306; other cell load information generating section 307; buffer section 308; error correction encoding section 309; modulating section 310; transmission power control section 311; and RF transmitting section 312.

RF receiving section 301 receives signals transmitted from base station apparatuses 100a to 100c via an antenna, and performs predetermined radio receiving processing (down converting, A/D conversion, etc.) on the received signal.

Demodulating section 302 demodulates the received signal after radio receiving processing, and outputs the obtained demodulated signal to error correction and decoding section 303.

Error correction and decoding section 303 performs error correction and decoding on the demodulated signal, outputs the received data, and outputs transmission rate commands included in the received signal to transmission rate command acquiring section 304.

The transmission rate command acquiring section 304 acquires the transmission rate commands transmitted from the respective base station apparatuses 100a to 100c from the received signal after error correction and decoding, and outputs the commands to transmission rate deciding section 305 and DOWN monitoring section 306. Namely, transmission rate command acquiring section 304 acquires AG or RG transmitted from base station apparatus 100a of cell 200a that is a primary cell and RG transmitted from base station apparatuses 100b and 100c of cell 200b and 200c that are non-primary cells.

Transmission rate deciding section 305 decides the uplink transmission rate in accordance with transmission rate commands transmitted from base station apparatuses 100a to 100c, and instructs the transmission rate to buffer section 308, error correction encoding section 309, modulating section 310, and transmission power control section 311.

Specifically, for example, when the transmission rate command from primary cell base station apparatus 100a is AG, and when RG indicates that both of the transmission rate commands from non-primary cell base station apparatuses 100b and 100c are "HOLD," transmission rate deciding section 305 decides the transmission rate in accordance with AG from base station apparatus 100a to be the final transmission rate. Further, for example, when the transmission rate command from primary cell base station apparatus 100a is AG, and, when the transmission rate command from at least one of non-primary cell base station apparatuses 100b and 100c is RG indicating "DOWN," transmission rate deciding section 305 decides a transmission rate that is one stage lower than the current transmission rate to be the final transmission rate.

Moreover, when, for example, the transmission rate command from all of the base station apparatuses 100a to 100c is RG, the transmission rate is lowered by one stage, providing that there is at least one "down." With methods other than these methods conforming to "DOWN" in a prioritized manner, transmission rate deciding section 305 may also synthesize "UP," "HOLD," and "DOWN" in transmission rate commands from the base station apparatuses in accordance with predetermined rules and decide a final transmission rate. For a rule for synthesizing RG's from the base station apparatuses, by deciding the final transmission rate in accordance with, for example, RG for which the transmission rate is a minimum among all RG's, loads at all the active set base station apparatus are not excessive.

DOWN monitoring section 306 monitors the transmission rate commands from non-primary cell base station apparatuses 100b and 100c and monitors the amount of "DOWN." Namely, DOWN monitoring section 306 calculates the number of times "DOWN" is transmitted as an RG transmission rate command from base station apparatuses 100b and 100c within, for example, a predetermined time. DOWN monitoring section 306 then determines that the load is large at the mobile station apparatus where the amount of "DOWN" is large, and reports that the load at this base station apparatus is large, to other cell load information generating section 307. Specifically, DOWN monitoring section 306 determines, that the load of the base station apparatus is large, when, for example, the number of times "DOWN" is transmitted within a predetermined time is a predetermined value or more.

DOWN monitoring section 306 may determine that, for example, the load of a base station apparatus transmitting "DOWN" consecutively more than a predetermined number of times is large, or may determine that the load of the base station apparatus is large when the ratio of transmitting "DOWN" within a predetermined time is greater than a predetermined value. Further, DOWN monitoring section 306 may also monitor the amount of "DOWN" for all of the active set base station apparatuses 100a to 100c.

Other cell load information generating section 307 generates other cell load information indicating the load state of base station apparatuses 100b and 100c according to the results of monitoring RG transmission rate commands by DOWN monitoring section 306. Namely, other cell load information generating section 307 takes whether or not the loads of base station apparatuses 100b and 100c are large as other cell load information.

Buffer section 308 temporarily accumulates transmission data, requested transmission rate information, and other cell load information, and outputs the accumulated data to error correction encoding section 309 according to the optimum transmission rate outputted by transmission rate deciding section 305.

Error correction encoding section 309 performs error correction encoding on data outputted from buffer section 308 using a coding rate corresponding to the optimum transmission rate, and outputs the obtained encoded data to modulation section 310.

Modulation section 310 modulates the encoded data using a modulation method corresponding to the final transmission rate and outputs obtained modulation data to RF transmission section 312.

Transmission power control section 311 decides transmission power corresponding to optimum transmission rate and sets the decided transmission power at RF transmission section 312.

RF transmission section 312 performs predetermined wireless transmission processing (D/A conversion, up converting, etc.) on modulation data and transmits this modulation data via the antenna with transmission power set by the transmission power control section 311.

Next, the uplink transmission rate control operations by base station apparatuses 100a to 100c and mobile station apparatus 300 configured in the above manner will be described.

First, AG and RG transmission rate commands are transmitted to mobile station apparatus 300 from base station apparatuses 100a to 100c. Here, as described above, with mobile station apparatus 300, it is taken that an AG transmission rate command is transmitted from base station apparatus 100a because cell 200a is a primary cell, and it is taken that an RG transmission rate command is transmitted from non-primary cell base station apparatuses 100b and 100c because 200b and 200c are non-primary cells.

Specifically, transmission rate commands generated by scheduling section 107 of base station apparatuses 100a to 100c is subjected to error correction and encoding together with transmission data by error correction and encoding section 108, is modulated by modulating section 109, and is subjected to predetermined wireless transmission processing by RF transmission section 110 before being transmitted to mobile station apparatus 300 via the antenna.

The signal including the transmitted transmission rate commands is then received by RF receiving section 301 via an antenna and is subjected to predetermined radio receiving processing. The received signal is then demodulated by demodulating section 302, is subjected to error correction and decoding by error correction and decoding section 303 to output the received data and to output the transmission rate commands to transmission rate command acquiring section 304.

Transmission rate command acquiring section 304 acquires AG transmission rate commands transmitted from base station apparatus 100a and RG transmission rate commands transmitted from base station apparatuses 100b and 100c, outputs all of the transmission rate commands to transmission rate deciding section 305, and outputs RG transmission rate commands to DOWN monitoring section The transmission rate commands are then outputted to transmission rate deciding section 305, and the uplink transmission rate for actually transmitting data is decided by transmission rate deciding section 305. Specifically, when, for example, both of the RG transmission rate commands transmitted from base station apparatuses 100b and 100c are "HOLD," a transmission rate conforming to an AG transmission rate command transmitted from base station apparatus 100a is taken to be the final transmission rate. Further, when at least one of the RG transmission rate commands transmitted from, for example, base station apparatuses 100b and 100c is "DOWN," a transmission rate that is one stage lower than the current transmission rate is taken to be the final transmission rate without conforming to the AG transmission rate command transmitted from base station apparatus 100a. The finally decided transmission rate is reported to buffer section 308, error correction and encoding section 309, modulation section 310 and transmission power control section 311.

Figure 7:
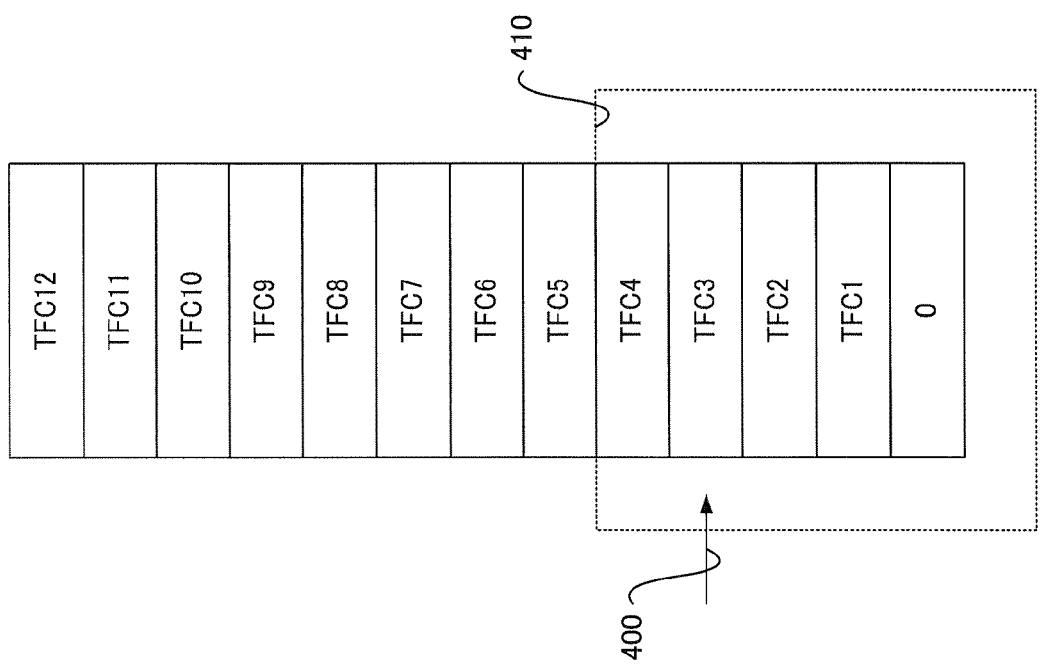
FIG. 7 is a view showing an example of a method for deciding transmission rate of Embodiment 1.

Deciding of the transmission rate described above is implemented by, for example, changing TFC as shown in FIG. 6. Namely, for example, a table shown in FIG. 7 is held by transmission rate deciding section 305, and the final transmission rate can be decided by TFC pointer 400 moving in accordance with a transmission rate command. When conforming to the AG transmission rate command, TFC pointer 400 may move substantially, but when conforming to the RG transmission rate command, TFC pointer 400 moves one stage at a time.

At this time, when conforming to the AG transmission rate, by limiting the range of movement of TFC pointer 400 to control TFC set 410, it is possible to suppress rapid changes in the transmission rate without the movement of the TFC pointer 400 becoming too large. Further, control TFC set 410 is not always fixed, and may be varied according to the load states of the active set base station apparatus. In this event, when control TFC set 401 is changed, mobile station apparatus 300 reports control TFC set 410 after change to all of the active set base station apparatuses.

On the other hand, "DOWN" of the RG transmission rate commands transmitted from non-primary cell base station apparatuses 100b and 100c is monitored by DOWN monitoring section 306. Specifically, DOWN monitoring section 306 monitors the RG transmission rate commands received within a predetermined time until the transmission rate command is received on this occasion, monitors, for example, the number of times and rate "DOWN" is received for each base station apparatus, and determines load states of the non-primary cell base station apparatuses. Namely, the load of a base station apparatus may be determined to be large when "DOWN" received within a predetermined time is a predetermined number or more, the load of a base station apparatus may be determined to be large when the number of consecutively received "DOWN" becomes a predetermined number, or the load of a base station apparatus may be determined to be large when the proportion of "DOWN" received within a predetermined time is greater than a predetermined value.

When the receiving power at the base station apparatuses exceeds the RoT threshold value, non-primary cell base station apparatuses 100b and 100c generate "DOWN" as the results of scheduling by the scheduling section 107. Therefore, at a base station apparatus that frequently transmit "DOWN," receiving power may exceed the RoT threshold value, and the load becomes large. In this embodiment, "DOWN" of the RG transmission rate commands transmitted from non-primary cell base station apparatuses 100b and 100c is monitored, and the load states at the base station apparatuses are determined from the statistical amount of "DOWN."

In this way, the base station apparatus for which the load is determined to be large through the statistical amount of "DOWN," is reported to other cell load information generating section 307. Other cell load information indicating whether or not the load at the non-primary cell base station apparatuses 100b and 100c is large is then generated by other cell load information generating section 307.

The statistical amount of "DOWN" itself corresponding to non-primary cell base station apparatuses 100b and 100c may be as other cell load information rather than taking whether or not the loads at non-primary cell base station apparatuses 100b and 100c are large as other cell load information. In this case, it is not necessary to determine the size of the load by DOWN monitoring section 306, but, rather, the size of the load only needs to be determined by primary cell base station apparatus 100a.

The generated other cell load information is then outputted to buffer section 308. Further, transmission data and required transmission rate information indicating the desired uplink transmission rate at mobile station apparatus 300 is temporarily accumulated in buffer section 308.

The transmission data of an amount corresponding to this transmission rate, requested transmission rate information, and other cell load information are outputted to error correction and encoding section 309 because the final transmission rate is reported to buffer section 308 from transmission rate deciding section 305. This data is then subjected to error correction and encoding at an coding rate corresponding to the final transmission rate by error correction and encoding section 309, and is modulated using a modulation method corresponding to the final transmission rate by modulation section 310. The obtained modulated data is outputted to RF transmission section 312. Further, transmission power is decided according to the final transmission rate by transmission power control section 311 and this transmission power is set at RF transmission section 312. The modulated data is then subjected to predetermined wireless transmission processing by RF transmission section 312 and is then transmitted to base station apparatuses 100a to 100c via an antenna at the set transmission power.

A signal including transmitted other cell information and requested transmission rate information is received via the antenna by RF receiving section 101 and is subjected to predetermined radio receiving processing. Further, at this time, RoT information measuring section 104 measures receiving power of the received signal, generates RoT information relating to breakdown of the receiving power, and outputs the result to scheduling section 107. The received signal is then demodulated by demodulating section 102 and subjected to error correction and decoding by error correction and decoding section 103. The received data is outputted, and requested transmission rate information is outputted to scheduling section 107. Other cell load information is outputted to other cell load information acquiring section 105.

Other cell load information acquiring section 105 acquires other cell load information indicating whether or not the loads at base station apparatuses 100b and 100c are large and reports the load states at the base station apparatuses to determining section 106. When the load states at base station apparatuses 100b and 100c are reported to determining section 106, other cell load information is discarded by determining section 106, and no operation at all is carried out for the scheduling section 107 if the base station apparatus is non-primary cell base station apparatuses 100b or 100c. On the other hand, when the base station apparatus is primary cell base station apparatus 100a, determining section 106 refers to the load states of base station apparatuses 100b and 100c of the other cell (that is, the non-primary cell), transmits a report of prohibiting an AG specifying TFC directly to scheduling section 107 when the load is large at either one of the base station apparatus. Further, when the load of either base station apparatus is not large, a report of permitting an AG directly specifying TFC is transmitted to scheduling section 107.

At scheduling section 107, requested transmission rate information and RoT information are referred to, allocated receiving power for the mobile station apparatus within the cell covered by the base station apparatus is decided, and a transmission rate command for implementing the transmission rate according to this receiving power is generated. Namely, at the scheduling section 107 of non-primary cell base station apparatuses 100b and 100c, RG transmission rate commands for either "HOLD" maintaining TFC or "DOWN" lowering TFC by one stage is generated.

Further, at scheduling section 107 of primary cell base station apparatus 100a, a transmission rate command for AG or RG is generated as a result of report from determining section 106. Namely, when AG is permitted by determining section 106, an AG transmission rate command directly specifying TFC is generated, and, when AG is prohibited, an RG transmission rate command of "UP," "HOLD," or "DOWN" is generated.

In this way, when the load is large at one of the non-primary cell base station apparatuses 100b and 100c, AG is prohibited. The uplink transmission rate from mobile station apparatus 300 is therefore prevented from becoming rapidly high by AG of primary cell base station apparatus 100a, thereby preventing the receiving power at base station apparatuses 100b and 100c from exceeding the RoT threshold value. In other words, it is possible to suppress receiving power at all active set base station apparatuses from exceeding an RoT threshold value and to prevent excessive loads.

Transmission rate commands for AG and RG are transmitted again to mobile station apparatus 300 from base station apparatuses 100a to 100c, and the uplink transmission rate is controlled below. At mobile station apparatus 300, the load states of non-primary cell base station apparatuses 100b and 100c are estimated from the RG transmission rate command.

In this way, according to this embodiment, the load states at the non-primary cell base station apparatuses are estimated by the mobile station apparatus based on an RG transmission rate command indicating increase or decrease of relative transmission rates transmitted from the active set base station apparatuses, and is reported to the primary cell base station apparatus. When the load at the non-primary cell base station apparatus is large, the primary cell base station apparatus does not generate an AG transmission rate command directly specifying the transmission rate. Because of this, when the load at the non-primary cell base station apparatus is large, the uplink transmission rate does not increase rapidly, and receiving power at all of the active set base station apparatus is suppressed from exceeding the RoT threshold value, thereby preventing excessive loads.

Embodiment 2

A feature of Embodiment 2 of the present invention is that the a mobile station apparatus determines the load states at the non-primary cell base station apparatus, and, when the load at the non-primary cell base station apparatus is large, does not conform to the AG transmission rate command transmitted from the primary cell base station apparatus.

The configuration of the mobile communication system of this embodiment is the same as in Embodiment 1 (FIG. 3) and will therefore be not described.

Figure 8:
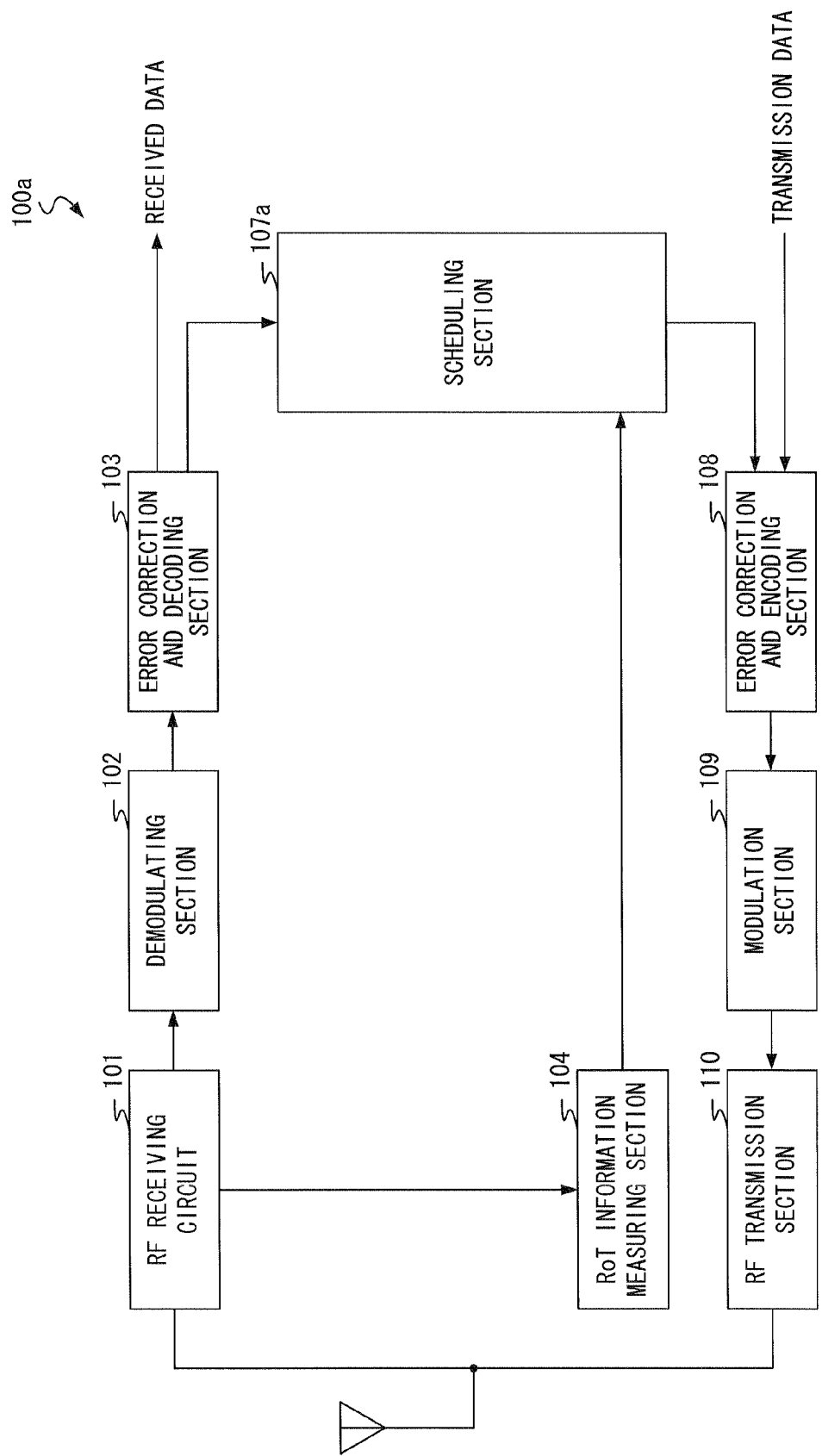
FIG. 8 is a block view showing a configuration of the main part of a base station apparatus of Embodiment 2 of the present invention.

FIG. 8 is a block view showing the configuration of the main part base station apparatus 100a of this embodiment.

In the same drawing, portions that are the same as in FIG. 4 are assigned the same codes and will not be described. Base station apparatus 100a shown in FIG. 8 is comprised of: RF receiving section 101; demodulating section 102; error correction decoding section 103; RoT information measuring section 104; scheduling section 107a; error correction and encoding section 108; modulating section 109; and RF transmission section 110. Base station apparatuses 100b and 100c also have the same configuration.

Scheduling section 107a carries out scheduling of the mobile station apparatus within cell 100a in accordance with requested transmission rate information and RoT information. Specifically, scheduling section 107a determines whether or not the requested transmission rate information transmitted from the mobile station apparatus can be satisfied from the RoT information, decides the transmission rate allocated to the mobile station apparatus, generates a transmission rate command corresponding to this transmission rate, and outputs this to error correction encoding section 108.

A difference of this embodiment from Embodiment 1 is that if the base station apparatus is a primary cell base station apparatus, scheduling section 107a generates an AG or RG transmission rate command regardless of load states at non-primary cell base station apparatuses. Further, if the base station apparatus is a non-primary cell base station apparatus, as in Embodiment 1, an RG transmission rate command is generated.

Figure 9:
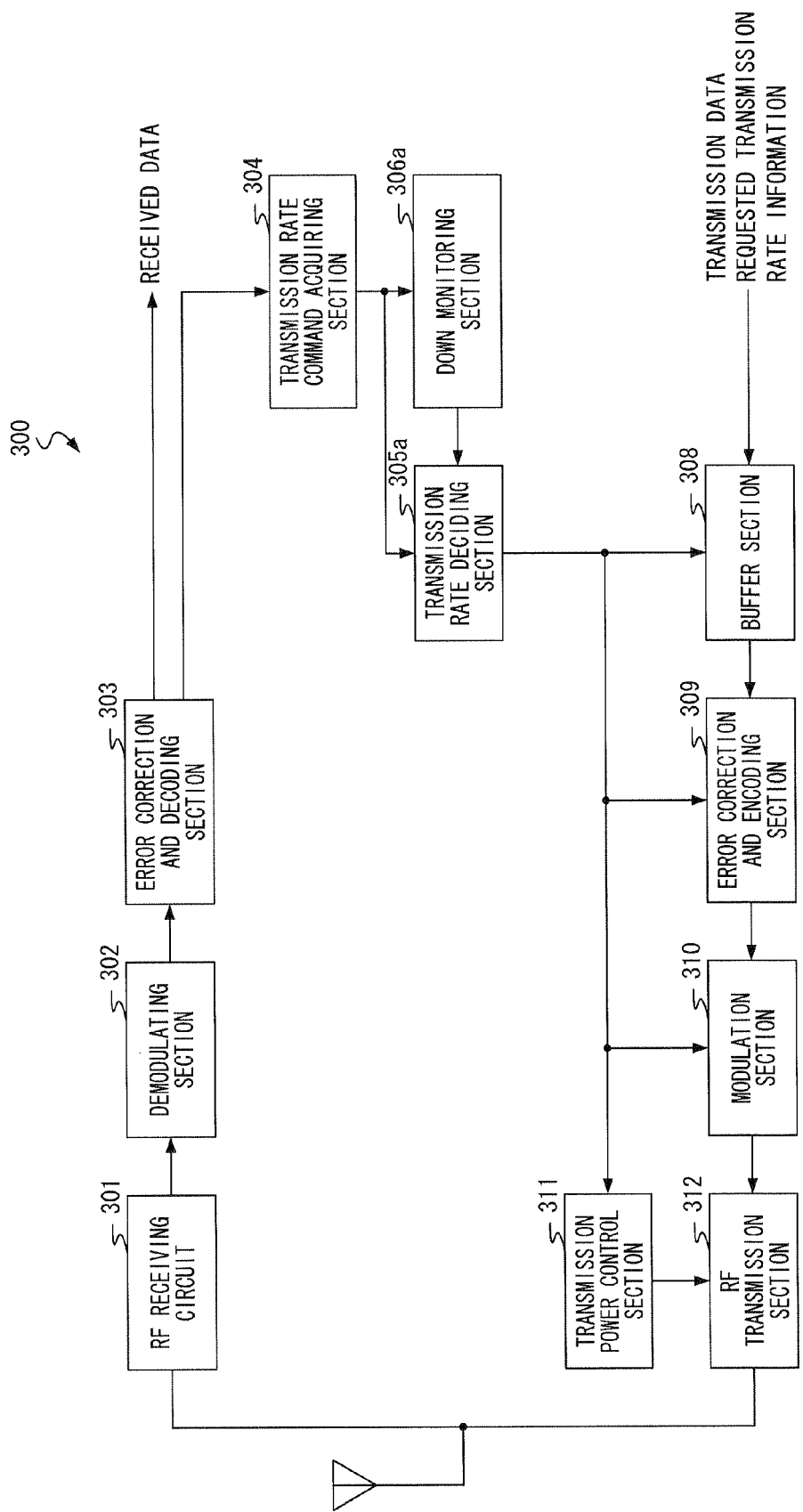
FIG. 9 is a block view showing a configuration of the main part of a mobile station apparatus of Embodiment 2.

FIG. 9 is a block view showing the configuration of the main part of mobile station apparatus 300 of this embodiment. In the same drawing, portions that are the same as in FIG. 5 are assigned the same codes and will not be described. Mobile station apparatus 300 shown in FIG. 9 is comprised of: RF receiving section 301; demodulating section 302; error correction and decoding section 303; transmission rate command acquiring section 304; transmission rate deciding section 305a; DOWN monitoring section 306a; buffer section 308; error correction and encoding section 309; modulating section 310; transmission power control section 311; and RF transmitting section 312.

Transmission rate deciding section 305a decides the uplink transmission rate in accordance with transmission rate commands transmitted from base station apparatuses 100a to 100c and "DOWN" monitoring results at DOWN monitoring section 306a (described later), and instructs a transmission rate to buffer section 308, error correction encoding section 309, modulating section 310, and transmission power control section 311.

Specifically, when, for example, the transmission rate command from primary cell base station apparatus 100a is AG, and the transmission rate commands from non-primary cell base station apparatuses 100b and 100c are both RG indicating "HOLD," and, further, there are no base station apparatus where the load is large from the results of monitoring "DOWN" at DOWN monitoring section 306a, transmission rate deciding section 305a decides the transmission rate conforming to AG from base station apparatus 100a as the final transmission rate. Further, when, for example, the transmission rate command from primary cell base station apparatus 100a is AG, and when the transmission rate commands from non-primary cell base station apparatuses 100b and 100c are both RG indicating "HOLD," the final transmission rate is decided based on RG from base station apparatuses 100b and 100c regardless of AG from base station apparatus 100a, providing that there is a base station apparatus where the load is large from the results of monitoring "DOWN" at DOWN monitoring section 306a.

DOWN monitoring section 306a monitors the transmission rate commands from non-primary cell base station apparatuses 100b and 100c and monitors the amount of "DOWN." Namely, DOWN monitoring section 306a counts the number of times "DOWN" is transmitted as an RG transmission rate command from base station apparatuses 100b and 100c within, for example, a predetermined time. DOWN monitoring section 306a then determines that the load is large at mobile station apparatus where the amount of "DOWN" is large, and reports that the load at this base station apparatus is large to transmission rate deciding section 305a. Specifically, DOWN monitoring section 306a determines, for example, that the load of the base station apparatus is large when the number of times "DOWN" is transmitted within a predetermined time is greater than a predetermined value.

DOWN monitoring section 306a may determine that, for example, the load of the base station apparatus transmitting "DOWN" consecutively more than a predetermined number of times is large, or may determine that the load of the base station apparatus is large when the ratio of transmitting "DOWN" within a predetermined time is greater than a predetermined value. Further, DOWN monitoring section 306a may also monitor the amount of "DOWN" for all of the active set base station apparatuses 100a to 100c.

Next, the uplink transmission rate control operations by base station apparatuses 100a to 100c and mobile station apparatus 300 configured in the above manner will be described.

First, like in Embodiment 1, AG and RG transmission rate commands generated by scheduling section 107a of base station apparatuses 100a to 100c are transmitted to mobile station apparatus 300. This operation is the same as for Embodiment 1 and will not be described here.

The signal including the transmitted transmission rate commands is then received by RF receiving section 301 via an antenna and is subjected to predetermined radio receiving processing. The received signal is then demodulated by the demodulating section 302, is subjected to error correction and decoding by error correction and decoding section 303. The received data is outputted, and the transmission rate commands are outputted to transmission rate command acquiring section 304.

Transmission rate command acquiring section 304 acquires AG transmission rate commands transmitted from base station apparatus 100a and RG transmission rate commands transmitted from base station apparatuses 100b and 100c, outputs all of the transmission rate commands to transmission rate deciding section 305a, and outputs RG transmission rate commands to DOWN monitoring section 306a.

On the other hand, "DOWN" of the RG transmission rate commands transmitted from non-primary cell base station apparatuses 100b and 100c are monitored by DOWN monitoring section 306a. Specifically, DOWN monitoring section 306a monitors the RG transmission rate commands received within a predetermined time until the transmission rate command is received on this occasion, monitors, for example, the number of times or rate "DOWN" is received for each base station apparatus, and determines the load states of the non-primary cell base station apparatuses. Namely, load of base station apparatus where "DOWN" is received a predetermined number of times or more within a predetermined time is determined to be large, or load of base station apparatus where the proportion of "DOWN" received within a predetermined time is a predetermined value or more is determined to be large.

In this way, the base station apparatus for which the load is determined to be large through the statistical amount of "DOWN," is reported to transmission rate deciding section 305a. The transmission rate for transmitting actual uplink data is then decided by transmission rate deciding section 305a. Specifically, for example, when both of RG transmission rate commands transmitted from base station apparatuses 100b and 100c are "HOLD," and there are no base station apparatus where the load is determined to be large from the statistical amount of "DOWN," the transmission rate is taken to be the final transmission rate conforming to AG transmission rate commands transmitted from base station apparatus 100a. Further, when, for example, both of the RG transmission rate commands are "HOLD," a transmission rate that is the same as the current transmission rate or a transmission rate one stage lower is taken to be the final transmission rate without conforming to AG transmission rate commands transmitted from base station apparatus 100a, providing that there is a base station apparatus where the load is determined to be large from a statistical amount of "DOWN." Finally decided transmission rate is reported to buffer section 308, error correction and encoding section 309, modulation section 310 and transmission power control section 311.

In this embodiment, when the load states of non-primary base station apparatuses 100b and 100c of the non-primary cell are determined from the statistical amount of "DOWN" by DOWN monitoring section 306a and there are base station apparatus where the load is large, transmission rate deciding section 305a ignores AG transmission rate commands transmitted from primary cell base station apparatus 100a and takes the transmission rate from RG as the final transmission rate. Namely, if primary cell base station apparatus 100a executes AG without taking into consideration other cell load states, AG is not carried out when other cell load is large. The receiving power at all of the base station apparatus of the active set is kept from exceeding the RoT threshold value by changing only mobile station apparatus 300 without changing the configuration of base station apparatuses 100a to 100c, thereby preventing excessive loads. Further, it is possible to reduce the amount of information such as other cell load information transmitted over the uplink.

Like in Embodiment 1, transmission data and requested transmission rate information below are transmitted to base station apparatuses 100a to 100c via the antenna using the coding rate, modulation method, and transmission power corresponding to the final transmission rate.

The signal including the transmitted requested transmission rate information is then received by RF receiving section 101 via an antenna and is subjected to predetermined radio receiving processing. Further, at this time, RoT information measuring section 104 measures receiving power of the received signal, generates RoT information and outputs the result to scheduling section 107a. Demodulating section 102 demodulates the received signal, and error correction and decoding section 103 performs error correction and decoding on the received signal, outputs the received data, and outputs requested transmission rate information to scheduling section 107.

Scheduling section 107a refers to requested transmission rate information and RoT information, decides receiving power to be allocated to the mobile station apparatus within the cell covered by the base station apparatus, and generates a transmission rate command for implementing the transmission rate according to this receiving power. Namely, scheduling section 107a of non-primary cell base station apparatuses 100b and 100c generates RG transmission rate commands for "HOLD" maintaining TFC or "DOWN" lowering TFC by one stage.

Further, at scheduling section 107a of primary cell base station apparatus 100a, a transmission rate command for AG or RG is generated. At this time, unlike Embodiment 1, there is no limitation in generating either of AG and RG transmission rate commands, and transmission rate commands are generated regardless of the load states of non-primary cell base station apparatuses 100b and 100c.

Transmission rate commands for AG and RG are transmitted again to mobile station apparatus 300 from base station apparatuses 100a to 100c, and the uplink transmission rate is controlled below. At mobile station apparatus 300, the load states of non-primary cell base station apparatuses 100b and 100c are estimated from the RG transmission rate command.

In this way, according to this embodiment, the load states at the non-primary cell base station apparatus are estimated by the mobile station apparatus based on an RG transmission rate command indicating increase or decrease of relative transmission rates and transmitted from the active set base station apparatus. When the load at the non-primary cell base station apparatus is large, the mobile station apparatus ignores an AG transmission rate command directly specifying the transmission rate transmitted from the primary base station apparatus. Because of this, when the load at the non-primary cell base station apparatus is large, the uplink transmission rate does not increase rapidly, receiving power at all of the active set base station apparatus is suppressed from exceeding the RoT threshold value, thereby preventing excessive load. Further, this is achieved by just changing the configuration of the mobile station apparatus, thereby reducing the amount of information transmitted over the uplink.

Embodiment 3

A feature of Embodiment 3 of the present invention is that a base station apparatus transmits RoT information, and a mobile station apparatus determines load states at non-primary cell base station apparatuses based on RoT information.

The configuration of the mobile communication system of this embodiment is the same as in Embodiment 1 (FIG. 3) and will therefore not be described.

The configuration of base station apparatus 100a of this embodiment is the same as base station apparatus 100a (FIG. 8) of Embodiment 2 and will therefore not be described. However, base station apparatus 100a of this embodiment transmits RoT information generated by RoT information measuring section 104 to mobile station apparatus 300 together with a transmission rate control command. Base station apparatuses 100b and 100c also have the same configurations.

Figure 10:
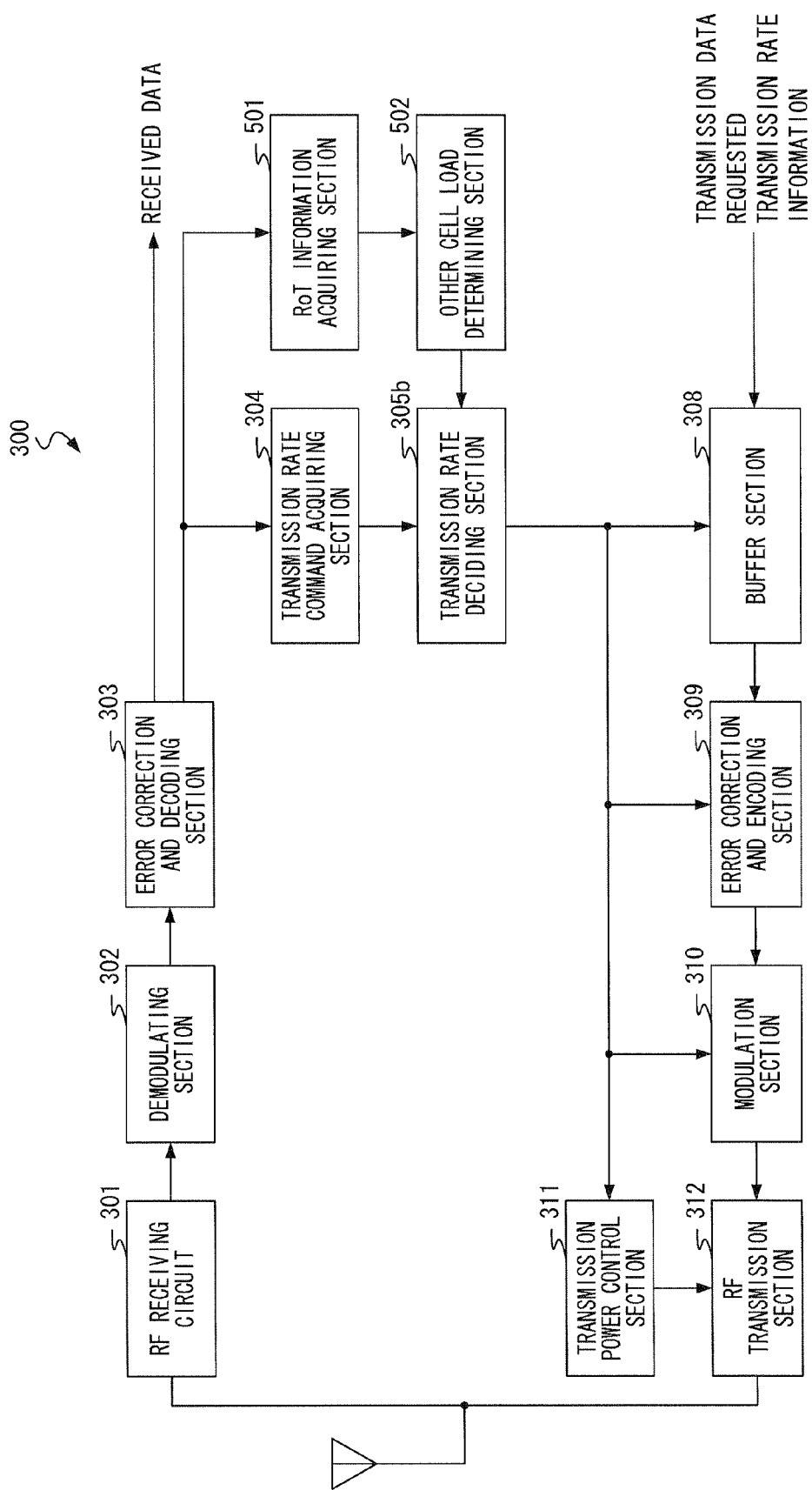
FIG. 10 is a block view showing a configuration of the main part of a mobile station apparatus of Embodiment 3 of the present invention.

FIG. 10 is a block view showing the configuration of the main part of mobile station apparatus 300 of this embodiment.

In the same drawing, portions that are the same as in FIG. 5 are assigned the same codes and will not be described. Mobile station apparatus 300 shown in FIG. 10 is comprised of: RF receiving section 301; demodulating section 302; error correction and decoding section 303; transmission rate command acquiring section 304; transmission rate deciding section 305b; RoT information acquiring section 501; other cell load determining section 502; buffer section 308; error correction and encoding section 309; modulating section 310; transmission power control section 311; and RF transmitting section 312.

RoT information acquiring section 501 acquires RoT information transmitted from base station apparatuses 100a to 100c from the received signal after error correction and outputs the information to other cell load determining section 502. Namely, RoT information acquiring section 501 acquires RoT information indicating breakdown of receiving power at base station apparatuses 100a to 100c and outputs the information to other cell load determining section 502.

Other cell load determining section 502 determines load states at non-primary cell base station apparatuses 100b and 100c from RoT information of base station apparatuses 100a to 100c. Specifically, other cell load determining section 502 refers to RoT information of base station apparatuses 100b and 100c and compares a difference (ΔRoT) of the receiving power and RoT threshold value per base station apparatus. Other cell load determining section 502 determines that the load of this base station apparatus is not large if the comparison results are such that ΔRoT is equal to or greater than a predetermined threshold value, and determines that the load of this base station apparatus is large if ΔRoT is less than a predetermined threshold value. Other cell load determining section 502 reports the determination result of the load states at non-primary cell base station apparatuses 100b and 100c to transmission rate determining section 305b.

Transmission rate deciding section 305b decides the uplink transmission rate in accordance with the transmission rate commands transmitted from base station apparatuses 100a to 100c and the determination results at other cell load determining section 502, and instructs the transmission rate to buffer section 308, error correction and encoding section 309, modulating section 310, and transmission power control section 311.

Specifically, when, for example, the transmission rate command from primary cell base station apparatus 100a is AG, and the transmission rate commands from non-primary cell base station apparatuses 100b and 100c are both RG indicating "HOLD," and, further, there are no base station apparatus where the load is large from the determination results at other cell load determining section 502, transmission rate deciding section 305b decides the transmission rate conforming to AG from base station apparatus 100a as the final transmission rate. Further, when, for example, the transmission rate command from primary cell base station apparatus 100a is AG and when the transmission rate commands from non-primary cell base station apparatuses 100b and 100c are both RG indicating "HOLD," the final transmission rate is decided based on RG from base station apparatuses 100b and 100c without conforming to AG from base station apparatus 100a, providing that there is a base station apparatus where the load is large from the determination results at other cell load determining section 502.

Next, the uplink transmission rate control operations by base station apparatuses 100a to 100c and mobile station apparatus 300 configured in the above manner will be described.

First, like in Embodiment 1, AG and RG transmission rate commands generated by scheduling section 107a of base station apparatuses 100a to 100c are transmitted to mobile station apparatus 300. Further, in this embodiment, RoT information generated by RoT information measuring section 104 of base station apparatuses 100a to 100c is transmitted to mobile station apparatus 300 together with a transmission rate command.

The signal including the transmitted transmission rate commands and the RoT information is then received by RF receiving section 301 via an antenna and is subjected to predetermined radio receiving processing. The received signal is then demodulated by the demodulating section 302, is subjected to error correction and decoding by error correction and decoding section 303. The received data is outputted, and the transmission rate commands are outputted to transmission rate command acquiring section 304, and the RoT information is outputted to RoT information acquiring section 501.

AG transmission rate commands transmitted from base station apparatus 100a and RG transmission rate commands transmitted from base station apparatuses 100b and 100c are acquired by transmission rate command acquiring section 304, and all of the transmission rate commands are outputted to transmission rate deciding section 305b.

On the other hand, RoT information acquiring section 501 acquires RoT information indicating breakdown of receiving power at base station apparatuses 100a to 100c and outputs RoT information of base station apparatuses 100a to 100c to other cell load determining section 502. Other cell load determining section 502 then refers to RoT information of base station apparatuses 100a to 100c and determines the load states at non-primary cell base station apparatuses 100b and 100c. Namely, the difference (ΔRoT) between an RoT threshold value and receiving power at the base station apparatuses are calculated from RoT information of base station apparatuses 100b and 100c, and ΔRoT is compared with a predetermined threshold value. As the results of this comparison, the load state of the base station apparatus where ΔRoT is a predetermined threshold value or more is determined not to be large, the load state of base station apparatus where ΔRoT is less than a predetermined threshold value is determined to be large. This determination results are then outputted to transmission rate deciding section 305b.

The transmission rate for transmitting actual uplink data is then decided by transmission rate deciding section 305b. Specifically, for example, when both of RG transmission rate commands transmitted from base station apparatuses 100b and 100c are "HOLD," and there are no base station apparatus where the load is determined to be large at the other cell load determining section 502, the transmission rate conforming to AG transmission rate commands transmitted from base station apparatus 100a is taken to be the final transmission rate. Further, when, for example, the RG transmission rate commands are "HOLD," a transmission rate that is the same as the current transmission rate or a transmission rate one stage lower is taken to be the final transmission rate without conforming to AG transmission rate commands transmitted from base station apparatus 100a, providing that there is base station apparatus where the load is determined to be large by other cell load determining section 502. The finally decided transmission rate is reported to buffer section 308, error correction and encoding section 309, modulation section 310 and transmission power control section 311.

In this embodiment, other cell load determining section 502 determines the load states of non-primary cell base station apparatuses 100b and 100c from RoT information per base station apparatus, and, when there is a base station apparatus where the load is large, transmission rate deciding section 305b ignores AG transmission rate commands transmitted from primary cell base station apparatus 100a and takes the transmission rate from RG as the final transmission rate. Namely, even if primary cell base station apparatus 100a carries out AG without taking into consideration the load states of other cell, AG is not executed when the load of other cell is large. It is possible to suppress receiving power at all active set base station apparatuses from exceeding an RoT threshold value, thereby preventing excessive load. Further, it is possible to accurately determine load states at base station apparatuses 100a to 100c because RoT information directly reflecting load states at base station apparatuses 100a to 100c are referred to.

Like in Embodiment 1, transmission data and requested transmission rate information are transmitted to base station apparatuses 100a to 100c via the antenna using the coding rate, modulation method, and transmission power corresponding to the final transmission rate.

Then, like in Embodiment 2, scheduling section 107a carries out scheduling using only requested transmission rate information and RoT information and generates transmission rate commands regardless of load states of non-primary cell base station apparatuses 100b and 100c.

Transmission rate commands for AG and RG and RoT information are transmitted again to mobile station apparatus 300 from base station apparatuses 100a to 100c, the uplink transmission rate is controlled, and at mobile station apparatus 300, load states of non-primary cell base station apparatuses 100b and 100c are estimated from the RoT information.

In this way, according to this embodiment, load states at non-primary cell base station apparatus are determined by a mobile station apparatus based on RoT information transmitted from active set base station apparatus. When the load at the non-primary cell base station apparatus is large, the mobile station apparatus ignores an AG transmission rate command directly specifying the transmission rate transmitted from the primary base station apparatus. Because of this, when the load at the non-primary cell base station apparatus is large, the uplink transmission rate does not increase rapidly, so that it is possible to suppress receiving power at all the active set base station apparatuses from exceeding the RoT threshold value, thereby preventing excessive load. Further, it is possible to accurately determine load states at the base station apparatuses because RoT information directly reflecting the load states are referred to.

Although in this embodiment, a configuration is adopted where load states at non-primary cell base station apparatuses are determined based on RoT information, and AG transmission rate commands are ignored depending on the determination results, a configuration may also be adopted where other cell load information is generated according to the determination results, and, like in Embodiment 1, instructing the transmission rate by AG is prohibited at the primary cell base station apparatus.

Further, although in this embodiment, a base station apparatus transmits RoT information, load states at the base station apparatus may also be determined by all active set base station apparatuses based on RoT information, and excessive load information may be transmitted to a mobile station apparatus where whether or not the load of the base station apparatus is excessive is indicated. In this event, a mobile station apparatus may ignore AG from a primary cell base station apparatus based on excessive load information or may transmit excessive load information to a primary cell base station apparatus. When excessive load information is transmitted to the primary cell base station apparatus, instructing a transmission rate by AG from the primary cell base station apparatus may be prohibited according to excessive load information.

Further, although with the above embodiments, mobile station apparatus 300 changes a coding rate, modulation method, and transmission power immediately after deciding the optimum transmission rate in accordance with a transmission rate command, changes in the actual transmission rate may be delayed and time the transmission rate is actually changed may be reported to the active set base station apparatuses when an optimum transmission rate is decided in accordance with an AG transmission rate command. As a result, when transmission rate changes rapidly due to AG transmission rate commands, all the active set base station apparatuses are able to have a preparation period during which resources such as demodulator and memory size etc. are caused to correspond to a new transmission rate.

A mobile station apparatus of a first aspect of the present invention is a mobile station apparatus simultaneously communicating with a plurality of base station apparatuses including one primary cell base station apparatus transmitting an absolute transmission rate command and at least one non-primary cell base station apparatus transmitting a relative transmission rate command, and adopting a configuration having: a determining section that determines whether or not a load at the non-primary cell base station apparatus is equal to or greater than a predetermined level; and a deciding section that decides an uplink transmission rate according to only the relative transmission rate command when the load at the non-primary cell base station apparatus is equal to or greater than the predetermined level.

According to this configuration, when a load at a non-primary cell base station apparatus is large, an uplink transmission rate is decided according to only relative transmission rate commands, so that the uplink transmission rate does not increase rapidly by absolute transmission rate commands, and receiving power at all active set base station apparatuses is suppressed from exceeding an RoT threshold value, thereby preventing excessive loads.

A mobile station apparatus of a second aspect of the present invention adopts a configuration in the first aspect where the deciding section has: a generating section that generates other cell load information of prohibiting transmission of the absolute transmission rate command by the primary cell base station apparatus when the load at the non-primary cell base station apparatus is equal to or greater than the predetermined level; a transmission section that transmits the generated other cell load information to the primary cell base station apparatus; and an acquiring section that acquires only the relative transmission rate commands from the plurality of base station apparatuses.

According to this configuration, when a load at a non-primary cell base station apparatus is large, other cell load information is transmitted to a primary cell base station apparatus and only relative transmission rate commands are acquired, so that a transmission rate is decided according to only relative transmission rate commands in a reliable manner. Further, unnecessary transmission rate commands are not transmitted from the primary cell base station apparatus.

A mobile station apparatus of a third aspect of the present invention adopts a configuration in the first aspect where the deciding section: has an acquiring section that acquires the absolute transmission rate command and the relative transmission rate commands from the plurality of base station apparatus; and ignores the acquired absolute transmission rate command and decides the transmission rate when the load at the non-primary cell base station apparatus is equal to or greater than the predetermined level.

According to this configuration, when a load at a non-primary cell base station apparatus is large, relative transmission rate commands are ignored and the transmission rate is decided, so that a transmission rate is decided according to only relative transmission rate commands in a reliable manner. Further, information feedback from the mobile station apparatus to the base station apparatus is not necessary, so that it is possible to reduce the amount of information transmitted over the uplink.

A mobile station apparatus of Embodiment 4 of the present invention adopts a configuration in the first aspect where the determining section: has a receiving section that receives the relative transmission rate command transmitted from the non-primary cell base station apparatus; and determines whether or not the load at the non-primary cell base station apparatus is equal to or greater than the predetermined level based on a statistical amount of a command to reduce the transmission rate among the received relative transmission rate command.

According to this configuration, the size of the load is determined based on a statistical amount of "DOWN" transmitted from the non-primary cell base station apparatus, so that it is possible to determine the size of the load of the non-primary cell base station apparatus with a simple configuration without requiring new information only for determining the size of the load.

A mobile station apparatus of the fifth embodiment of the present invention adopts a configuration in the fourth aspect where the determining section: determines that the load at the non-primary cell base station apparatus is equal to or greater than the predetermined level when the received command to reduce the transmission rate is equal to or greater than a predetermined number of times within a predetermined time.

According to this configuration, when the number of "DOWN" received within a predetermined time is large, the load is determined to be large, so that it is possible to detect a state where receiving power at the non-primary cell base station apparatus exceeds the RoT threshold value in a reliable manner.

A mobile station apparatus of a sixth aspect of the present invention adopts a configuration in the first aspect where the determining section: has a receiving section that receives RoT information indicating breakdown of the receiving power at the non-primary cell base station apparatus; and determines whether or not the load at the non-primary cell base station apparatus is equal to or greater than the predetermined level based on the received RoT information.

According to this configuration, the size of the load is determined based on RoT information transmitted from the non-primary cell base station apparatus, so that it is possible to determine the load state at the non-primary cell base station apparatus in a direct and reliable manner.

A mobile station apparatus of a seventh aspect of the present invention adopts a configuration in the sixth aspect where the determining section: determines that load at non-primary cell base station apparatus is equal to or greater than the predetermined level when a difference between receiving power at the non-primary cell base station apparatus and an RoT threshold value indicating maximum receivable power is equal to or less than a predetermined threshold value.

According to this configuration, when the difference between receiving power and RoT threshold value is small, the load is determined to be large, so that it is possible to detect a state where receiving power at the non-primary cell base station apparatus exceeds the RoT threshold value in a reliable manner.

A mobile station apparatus of an eighth aspect of the present invention adopts a configuration in the first aspect where the determining section: has a receiving section that receives excessive load information indicating load states at the non-primary cell base station apparatus; and determines whether or not the load at the non-primary cell base station apparatus is equal to or greater than a predetermined level based on the received excessive load information.

A mobile station apparatus of a ninth aspect of the present invention adopts a configuration in the first aspect where the determining section has a receiving section that receives excessive load information indicating load states at the non-primary cell base station apparatus, and the deciding section has: a transmission section that transmits the received excessive load information to the primary cell base station apparatus; and an acquiring section that acquires only the relative transmission rate commands from the plurality of base station apparatus.

According to this configuration, even when the base station apparatuses determine the load states of the base station apparatuses, the uplink transmission rate does not increase rapidly by absolute transmission rate commands, and receiving power at all the active set base station apparatuses is suppressed from exceeding an RoT threshold value, thereby preventing excessive loads.

A mobile station apparatus of a tenth aspect of the present invention adopts a configuration in the first aspect where the deciding section limits a range within which the transmission rate changes when an uplink transmission rate is decided according to the absolute transmission rate command.

According to this configuration, changes in a transmission rate according to absolute transmission rate commands is limited, so that it is possible to prevent rapid increases in the transmission rate even when the load of the non-primary cell base station apparatus is small, thereby preventing excessive loads in a more reliable manner.

A mobile station apparatus of an eleventh aspect of the present invention adopts a configuration in the tenth aspect where, when the range within which the transmission rate changes, the deciding section reports a range after change to the plurality of base station apparatuses.

According to this configuration, when the range within which the transmission rate changes is changed, a range after change is reported, so that it is possible for the active set base station apparatuses to prepare resources in advance for the possible maximum transmission rate obtained as a result of change.

A mobile station apparatus of a twelfth aspect of the present invention adopts a configuration in the first aspect where the deciding section delays time the uplink transmission rate changes and reports the time the transmission rate changes after the delay to the plurality of base station apparatus when the uplink transmission rate is decided according to the absolute transmission rate command.

According to this configuration, change in transmission rate is delayed according to absolute transmission rate commands and the time the transmission rate actually changes is reported, so that it is possible for the active set base station apparatuses to prepare resources for the actual transmission rate.

A mobile station apparatus of a thirteenth aspect of the present invention adopts a configuration in the first aspect where, when the transmission rate is decided using the absolute transmission rate command and the relative transmission rate command, the deciding section decides the uplink transmission rate in accordance with a command, providing that the command instructing to reduce the transmission rate is included in the relative transmission rate command.

According to this configuration, if one "DOWN" is received, the uplink transmission rate is lowered by one stage, so that it is possible to prevent interference power for all the active set base station apparatuses from increasing in a reliable manner.

A base station apparatus of a fourteenth aspect of the present invention is a base station apparatus communicating with a plurality of mobile station apparatuses including a mobile station apparatus during soft handover, and adopting a configuration having: a receiving section that receives other cell load information indicating load states at another base station apparatus, other than the base station apparatus, with which the mobile station apparatus during the soft handover is communicating; and a scheduling section that generates an absolute transmission rate commands or relative transmission rate commands corresponding to uplink transmission rates allocated to the plurality of mobile station apparatuses, in this apparatus the scheduling section restricts generation of the absolute transmission rate commands when the load at the another base station apparatus other than the base station apparatus is determined to be equal to or greater than a predetermined level by the other cell load information.

According to this configuration, scheduling is carried out by limiting generation of relative transmission rate commands when the load at the base station apparatus other than the base station apparatus is determined to be large from other cell load information, so that by, for example, prohibiting generating relative transmission rate commands, the uplink transmission rate does not increase rapidly by absolute transmission rate commands, and receiving power at all the active set base station apparatuses is suppressed from exceeding an RoT threshold value, thereby preventing excessive loads.

A base station apparatus of a fifteenth aspect of the present invention adopts a configuration in the fourteenth aspect where the scheduling section generates an absolute transmission rate command specifying a transmission rate within a range of a predetermined width when the load at the another base station apparatus other than the base station apparatus is equal to or greater than the predetermined level by the other cell load information.

According to this configuration, AG specifying a transmission rate within a predetermined width is generated, so that the uplink transmission rate does not increase rapidly by absolute transmission rate commands, and the transmission rate can be changed rapidly.

A transmission rate control method of a sixteenth aspect of the present invention is a transmission rate control method for a mobile station apparatus simultaneously communicating with a plurality of base station apparatuses including one primary cell base station apparatus transmitting absolute transmission rate commands and at least one non-primary cell base station apparatus transmitting relative transmission rate commands, and having the steps of: determining whether or not a load at the non-primary cell base station apparatus is equal to or greater than a predetermined level; and deciding an uplink transmission rate according to only the relative transmission rate command when the load at the non-primary cell base station apparatus is equal to or greater than the predetermined level.

According to this method, when the load at the non-primary cell base station apparatus is large, the uplink transmission rate is decided according to only relative transmission rate commands, so that the uplink transmission rate does not increase rapidly by absolute transmission rate commands, and receiving power at all the active set base station apparatus is suppressed from exceeding an RoT threshold value, thereby preventing excessive loads.

INDUSTRIAL APPLICABILITY

A mobile station apparatus, base station apparatus and transmission rate control method of the present invention suppress receiving power at all active set base station apparatuses from exceeding an RoT threshold value, prevent excessive loads, and are, for example, useful as a mobile station apparatus, base station apparatus, and transmission rate control method in a mobile communication system where a mobile station apparatus during a soft handover is instructed an uplink transmission rate from a plurality of base station apparatuses.

The invention claimed is:

1. A mobile station apparatus that simultaneously communicates with a plurality of base station apparatuses including one primary cell base station apparatus that transmits an absolute transmission rate command, and at least one non-primary cell base station apparatus that transmits a relative transmission rate command, the mobile station apparatus comprising:

a determining section that determines whether or not a load at the non-primary cell base station apparatus is equal to or greater than a predetermined level; and a deciding section that decides an uplink transmission rate according to the relative transmission rate command, and not the absolute transmission rate command, when the load at the non-primary cell base station apparatus is equal to or greater than the predetermined level, wherein:

the deciding section comprises:

a generating section that generates other cell load information that prohibits transmission of the absolute transmission rate command by the primary cell base station apparatus when the load at the non-primary cell base station apparatus is equal to or greater than the predetermined level;

a transmission section that transmits the generated other cell load information to the primary cell base station apparatus; and an acquiring section that acquires only relative transmission rate commands from the plurality of base station apparatuses when the load at the non-primary cell base station apparatus is equal to or greater than the predetermined level.

2. The mobile station apparatus of claim 1, wherein the determining section:

determines whether or not the load at the non-primary cell base station apparatus is equal to or greater than the predetermined level based on a statistical amount of a command to reduce the transmission rate among the acquired relative transmission rate commands.

3. The mobile station apparatus of claim 2, wherein the determining section:

determines that the load at the non-primary cell base station apparatus is equal to or greater than the predetermined level when the command to reduce the transmission rate is received equal to or greater than a predetermined number of times within a predetermined time period.

4. The mobile station apparatus of claim 1, wherein the determining section:

comprises a receiving section that receives rise over thermal (RoT) information indicating breakdown of a receiving power at the non-primary cell base station apparatus; and determines whether or not the load at the non-primary cell base station apparatus is equal to or greater than the predetermined level based on the received RoT information.

5. The mobile station apparatus of claim 4, wherein the determining section:

determines that the load at the non-primary cell base station apparatus is equal to or greater than the predetermined level when a difference between the receiving power at the non-primary cell base station apparatus and an RoT threshold value indicating maximum receivable power is equal to or less than a predetermined threshold value.

6. The mobile station apparatus of claim 1, wherein the determining section:
  comprises a receiving section that receives excessive load information indicating load states at the non-primary cell base station apparatus; and
  determines whether or not the load at the non-primary cell base station apparatus is equal to or greater than a predetermined level based on the received excessive load information.

7. A base station apparatus that communicates with at least one mobile station apparatus according to claim 1, the base station apparatus comprising:
  a receiving section that receives other cell load information indicating load states at another base station apparatus and transmitted from the mobile station apparatus; and
  a scheduling section that generates absolute transmission rate commands and stops transmitting the absolute transmission rate commands when the other cell load information is received.

8. A transmission rate control method for a mobile station apparatus that simultaneously communicates with a plurality of base station apparatuses including one primary cell base station apparatus that transmits an absolute transmission rate command, and at least one non-primary cell base station apparatus that transmits a relative transmission rate command, the method comprising the steps of:
  determining whether or not a load at the non-primary cell base station apparatus is equal to or greater than a predetermined level;
  generating other cell load information that prohibits transmission of the absolute transmission rate command by the primary cell base station apparatus when the load at the non-primary cell base station apparatus is equal to or greater than the predetermined level;
  transmitting the generated other cell load information to the primary cell base station apparatus;
  acquiring only relative transmission rate commands from the plurality of base station apparatuses when the load at the non-primary cell base station apparatus is equal to or greater than the predetermined level; and
  deciding an uplink transmission rate according to a relative transmission rate command, and not the absolute transmission rate command, when the load at the non-primary cell base station apparatus is equal to or greater than the predetermined level.

* * * * *